US012518206B2

(12) United States Patent
Archuleta et al.

(10) Patent No.: US 12,518,206 B2
(45) Date of Patent: Jan. 6, 2026

(54) SIGNAL DATA SIGNATURE CLASSIFIERS TRAINED WITH SIGNAL DATA SIGNATURE LIBRARIES AND A MACHINE LEARNING DERIVED STRATEGIC BLUEPRINT

(71) Applicant: Covid Cough, Inc., Greenwood Village, CO (US)

(72) Inventors: Michelle Archuleta, Lakewood, CO (US); Maurice A. Ramirez, Lake Wales, FL (US); Nolan Donaldson, Denver, CO (US); Adam Stogsdill, Cypress, TX (US); Morgan Cox, Lakewood, FL (US); Simon Kotchou, Phoenix, AZ (US); Robert F. Scordia, Ridgewood, NY (US); Mark Fogarty, Seneca, SC (US)

(73) Assignee: Covid Cough, Inc., Greenwood Village, CO (US)

( * ) Notice: Subject to any disclaimer, the term of this patent is extended or adjusted under 35 U.S.C. 154(b) by 894 days.

(21) Appl. No.: 17/698,937

(22) Filed: Mar. 18, 2022

(65) Prior Publication Data
US 2022/0300856 A1    Sep. 22, 2022

Related U.S. Application Data

(60) Provisional application No. 63/163,380, filed on Mar. 19, 2021.

(51) Int. Cl.
*G06N 20/00*         (2019.01)
*G06N 3/04*          (2023.01)
(Continued)

(52) U.S. Cl.
CPC .............. *G06N 20/00* (2019.01); *G06N 3/04* (2013.01); *G06N 7/01* (2023.01); *G10L 25/66* (2013.01);
(Continued)

(58) Field of Classification Search
CPC ........... G06N 20/00; G06N 3/04; G06N 7/01; G06N 3/044; G06N 3/0464; G06N 3/084;
(Continued)

(56) References Cited

U.S. PATENT DOCUMENTS 5,199,077 A    3/1993   Wilcox et al.
5,660,176 A    8/1997   Iliff
(Continued)

FOREIGN PATENT DOCUMENTS

CN     108766419 B    10/2020
WO     2019155052 A1   8/2019
(Continued)

OTHER PUBLICATIONS

K. S. Alqudaihi et al., "Cough Sound Detection and Diagnosis Using Artificial Intelligence Techniques: Challenges and Opportunities," in IEEE Access, vol. 9, pp. 102327-102344, 2021, doi: 10.1109/ACCESS.2021.3097559. (Year: 2021).*
(Continued)

*Primary Examiner* — James T Tsai
(74) *Attorney, Agent, or Firm* — Greenberg Traurig, LLP; Kristopher Reichlen; David J. Dykeman

(57) ABSTRACT

Systems and methods of the present disclosure enable signal data signature detection using a memory unit and processor, where the memory using stores a computer program or computer programs created by the physical interface on a temporary basis. The computer program, when executed, cause the processor to perform steps to receive a signal data signature recording from at least one data source, receive a dataset of labeled signal data signature recordings including signal data signature recording labels, identify, using at least one machine learning model, boundaries within the dataset of labeled signal data signature recordings, classify the signal data signature recording to produce an output label
(Continued)

using a compendium of signal data signature classifiers based on the boundaries within the dataset of labeled signal data signature recordings, determine an output type of the signal data signature recording, and display the output label on a display media.

20 Claims, 10 Drawing Sheets

(51) Int. Cl.
*G06N 7/01* (2023.01)
*G10L 25/66* (2013.01)

(52) U.S. Cl.
CPC ...... *G06F 2218/02* (2023.01); *G06F 2218/12* (2023.01)

(58) Field of Classification Search
CPC .......... G06N 5/01; G06N 20/20; G10L 25/66; G06F 2218/02; G06F 2218/12; G06F 18/254; G06F 18/295; G06F 18/2185
See application file for complete search history.

(56) References Cited

U.S. PATENT DOCUMENTS

| | | | |
|---|---|---|---|
| 7,386,453 B2 | 6/2008 | Polanyi et al. | |
| 9,015,093 B1 | 4/2015 | Commons | |
| 9,418,059 B1 | 8/2016 | Singliar et al. | |
| 10,098,569 B2 | 10/2018 | Abeyratne et al. | |
| 10,796,714 B2 | 10/2020 | Levanon et al. | |
| 11,240,181 B1 | 2/2022 | Nagaraja et al. | |
| 12,070,323 B2* | 8/2024 | Chou | G06N 20/00 |
| 2004/0193419 A1 | 9/2004 | Kimball et al. | |
| 2007/0026406 A1 | 2/2007 | ElGhaoui et al. | |
| 2007/0276278 A1 | 11/2007 | Coyle et al. | |
| 2008/0059152 A1 | 3/2008 | Fridman et al. | |
| 2009/0125623 A1 | 5/2009 | Garg et al. | |
| 2009/0311657 A1 | 12/2009 | Dodelson et al. | |
| 2009/0312660 A1* | 12/2009 | Guarino | G16H 50/80 600/529 |
| 2016/0078167 A1 | 3/2016 | Rosner et al. | |
| 2016/0246772 A1 | 8/2016 | Hoover et al. | |
| 2017/0003948 A1 | 1/2017 | Iyer et al. | |
| 2017/0180266 A1 | 6/2017 | Frank et al. | |
| 2017/0278018 A1 | 9/2017 | Winih et al. | |
| 2018/0060512 A1 | 3/2018 | Sorenson et al. | |
| 2018/0182362 A1 | 6/2018 | Li | |
| 2019/0347557 A1 | 11/2019 | Khan | |
| 2019/0348064 A1 | 11/2019 | Lesso | |
| 2020/0008725 A1 | 1/2020 | Bach et al. | |
| 2020/0015709 A1 | 1/2020 | Peltonen et al. | |
| 2020/0027558 A1 | 1/2020 | Abeyratne et al. | |
| 2020/0034553 A1 | 1/2020 | Kenyon et al. | |
| 2020/0143267 A1 | 5/2020 | Gidney | |
| 2020/0152330 A1 | 5/2020 | Anushiravani et al. | |
| 2020/0193735 A1* | 6/2020 | Jung | G07C 5/06 |
| 2020/0210538 A1 | 7/2020 | Wang et al. | |
| 2020/0234188 A1 | 7/2020 | Maffei Vallim | |
| 2020/0323484 A1 | 10/2020 | Aronovich et al. | |
| 2020/0327379 A1 | 10/2020 | Dong | |
| 2020/0337625 A1 | 10/2020 | Aimone et al. | |
| 2020/0381130 A1 | 12/2020 | Edwards et al. | |
| 2020/0388287 A1 | 12/2020 | Anushiravani et al. | |
| 2020/0411036 A1 | 12/2020 | Daimo | |
| 2021/0049421 A1 | 2/2021 | Tandecki et al. | |
| 2021/0076977 A1* | 3/2021 | Abeyratne | G16H 50/30 |
| 2021/0128074 A1 | 5/2021 | Leydon | |
| 2021/0219893 A1 | 7/2021 | Luz et al. | |
| 2021/0234668 A1 | 7/2021 | Manamohan et al. | |
| 2021/0248517 A1 | 8/2021 | Soppin et al. | |
| 2021/0298711 A1* | 9/2021 | Miri | G16H 50/20 |
| 2021/0338154 A1 | 11/2021 | Abeyratne | |
| 2021/0357586 A1 | 11/2021 | Archuleta | |
| 2022/0027725 A1 | 1/2022 | Nongpiur et al. | |
| 2022/0058339 A1 | 2/2022 | Archuleta | |
| 2022/0067445 A1 | 3/2022 | Archuleta et al. | |
| 2022/0122740 A1 | 4/2022 | Nematiosseinabadi et al. | |
| 2022/0130415 A1 | 4/2022 | Garrison et al. | |
| 2022/0215248 A1 | 7/2022 | Ramirez et al. | |
| 2022/0293123 A1 | 9/2022 | Ramirez et al. | |
| 2022/0309407 A1* | 9/2022 | Ramirez | G06N 20/20 |
| 2023/0329646 A1* | 10/2023 | Zhou | A61B 7/003 |
| 2023/0368000 A1 | 11/2023 | Cox et al. | |
| 2023/0368026 A1 | 11/2023 | Cox et al. | |
| 2024/0127078 A1 | 4/2024 | Elyaderani et al. | |

FOREIGN PATENT DOCUMENTS

| | | |
|---|---|---|
| WO | 2020051256 A1 | 3/2020 |
| WO | 2020069048 A1 | 4/2020 |
| WO | 2020104465 A2 | 5/2020 |
| WO | 2021119742 A1 | 6/2021 |
| WO | 2021119743 A1 | 6/2021 |
| WO | 2021253093 A1 | 12/2021 |
| WO | 2022051523 A1 | 3/2022 |
| WO | 2022091062 A1 | 5/2022 |
| WO | 2022147566 A1 | 7/2022 |
| WO | 2022192606 A1 | 9/2022 |
| WO | 2022198105 A1 | 9/2022 |
| WO | 2022204573 A1 | 9/2022 |
| WO | 2023220665 A1 | 11/2023 |
| WO | 2023220683 A1 | 11/2023 |
| WO | 2024059792 A1 | 3/2024 |
| WO | 2024059796 A1 | 3/2024 |

OTHER PUBLICATIONS

J.-M. Liu, M. You, Z. Wang, G.-Z. Li, X. Xu and Z. Qiu, "Cough detection using deep neural networks," 2014 IEEE International Conference on Bioinformatics and Biomedicine (BIBM), Belfast, UK, 2014, pp. 560-563, doi: 10.1109/BIBM.2014.6999220. (Year: 2014).*
International Search Report in International Application No. PCT/US2023/066864 mailed Sep. 13, 2023.
International Search Report in International Application No. PCT/US2023/066888 mailed Sep. 18, 2023.
International Search Report in International Application No. PCT/US2023/072499 mailed Dec. 12, 2023.
Brownlee: A Gentle Introduction to Imbalanced Classification (Year: 2020).
Chen: When Machine Learning Meets Blockchain 2018 (Year: 2018).
Guha: One Shot Federated Learning 2019 (Year: 2019).
Herresthal: Swarm Learning for Decentralized Confidential Clinical ML May 2021 (Year: 2021).
Herresthal: Swarm Learning privacy ML Disease Classification_ 2020 (Year: 2020).
Jackson: City of Jackson COVID19 Symptom Collector Chrysalis Partners Apr. 2020 (Year: 2020).
Jadon: What Happens When You Run a Computer Program 2020 Loading Programs into RAM (Year: 2020).
Kolding: Chrysalis Partners Launches Covid19 Symptom Collector_ Apr. 2020 (Year: 2020).
Li: Explicit Inductive Bias for Transfer Learning CNNs 2018 (Year: 2018).
Liu: Bagging based ensemble transfer learning 2016 (Year: 2016).
Liu: Cough Detection Using Deep Neural Networks 2014 (Year: 2014).
Merriam Webster: Compendium Definition & Meaning 2024 (Year: 2024).
Tan: A Survey on Deep Transfer Learning 2018 (Year: 2018).
Weiss: A survey of transfer learning 2016 (Year: 2016).
Zhuang: Comprehensive Survey on Transfer Learning 2020 (Year: 2020).

(56) References Cited

OTHER PUBLICATIONS

Ratri et al., "A Comparative Study on Signature Recognition", IEEE, pp. 167-171, Nov. 8, 2014. Retrieved from the Internet: Ratri et al., "A Comparative Study on Signature Recognition", IEEE, https://ieeexplore.ieee.org/stamp/stamp.jsp?tp=&arbynber=7065735.

AL Texsoft. "MLOps: Methods and Tools of DevOps for Machine Learning." Jul. 23, 2020 Retrieved on Jun. 26, 2022 from <https://www.altexsoft.com/blog/mlops-methods-tools/> entire document.

Rodriguez et al. "Hybrid analysis pipelines in the REANA reproducible analysis platform." EPJ Web of Conferences. vol. 245. EDP Sciences, 2020. Nov. 16, 2020. Retrieved on Jun. 26, 2022 from <https://www.epj-conferences.org/articles/epjconf/abs/2020/21/epjconf_chep2020_06041/epjco nf_chep2020_06041.html> entire document.

Shen, "Movements Classification of Multi-Channel sEMG Based on CNN and Stacking Ensemble Learning" Special Section on Smart Health Sensing and Computational Intelligence: from Big Data to Big Impacts. IEEE Access, vol. 7, pp. 137489-137500, Oct. 3, 2019.

Stewart "Software as a Medical Device (SAMO): Clinical Evaluation—Guidance for Industry 1-20 and Food and Drug Administration Staff" U.S. Department of Health and Human Services, Food and Drug Administration, Dec. 8, 2017, Retrieved on Jun. 26, 2022 from <https://www.fda.gov/files/medical%20devices/publish_ed/Software-as-a-Medical-Device-%28SAMD%29-Clinical-Evaluation-Guidance-for-Industry-and-Food-and-Drug-Administration-Staff.pdf> entire document.

Teyhouee, "Cough Detection Using Hidden Markov Models" arxiv. Arxiv.org. Apr. 28, 2019 DOI: ARxIV: 1904.12354v1.

International Search Report in International Application No. PCT/US2022/021041 mailed Jul. 25, 2022.

Ashby, "A Novel Cough Audio Pre-Processing and Segmentation Algorithm for COVID-19 Detection," University of Brighton, School of Architecture, Technology and Engineering, Bachelor of Science Thesis, Jun. 2, 2022, www.researchgate.net/profile/Alice-Ashby/publication/363057325.

Ashby et al., "Cough-Based COVID-19 Detection with Audio Quality Clustering and Confidence Measure Based Learning," Conformal and Probabilistic Prediction with Applications, Proceedings of Machine Learning Research, pp. 129-148, Aug. 30, 2022.

Zhang et al., "Novel COVID-19 Screening Using Cough Recordings of a Mobile Patient Monitoring System," 2021 43rd Annual International Conference of the IEEE Engineering in Medicine & Biology Society (EMBC). IEEE, pp. 2353-2357, Nov. 7, 2021.

International Search Report in International Application No. PCT/US2023/066888 mailed Jan. 24, 2024.

He et al., "Read, Watch, and Move: Reinforcement Learning for Temporally Grounding Natural Language Descriptions in Videos", Proceedings of the AAAI Conference on Artificial Intelligence, vol. 33, No. 1, pp. 8393-8400, Jul. 17, 2019.

Huang et al., "SAP: Self-Adaptive Proposal Model for Temporal Action Detection Based on Reinforcement Learning", Proceedings of the AAAI Conference on Artificial Intelligence, vol. 32, No. 1, pp. 6951-6958, Apr. 27, 2018.

\* cited by examiner

SIGNAL DATA SIGNATURE CLASSIFIERS TRAINED WITH SIGNAL DATA SIGNATURE LIBRARIES AND A MACHINE LEARNING DERIVED STRATEGIC BLUEPRINT

CROSS-REFERENCE TO RELATED APPLICATIONS

This application claims priority to U.S. Provisional Application 63/163,380 filed on Mar. 19, 2021, which is incorporated herein by reference in its entirety.

FIELD

The present disclosure relates generally to Artificial Intelligence and specifically to signal data signature classifiers and machine learning for signal data signature classification. In particular, the present disclosure is directed to signal data signature detection, signal data signature classification, utilizing a strategic machine learning derived blueprint. In particular, it relates to building a compendium of signal data signature classifiers from training data whereby signal data signature classifier is used based on the natural decision boundaries within the signal data signature.

BACKGROUND

Signal Data Signature detection, characterization and classification is the task of recognizing a source signal data signature and its respective temporal parameters within a source signal data stream or recording. Sound Event Detection (SED) is a commercial example of signal data signature detection with many different applications. SED is the task of recognizing sound events and their respective temporal start and end time in an audio recording. SED aims at processing the continuous acoustic signal and converting it into symbolic descriptions of the corresponding sound events as well as the timing of those events. Commercial applications for SED and other signal data signature detection algorithms include context-based indexing, retrieval in multimedia databases, unobtrusive monitoring in health care, surveillance, and medical diagnostics.

The application of signal data signature detection as a medical diagnostic or screening tool is particularly attractive as it represents a non-intrusive, real-time diagnostic that can be essential during public health crisis. In the 2020 COVID-19 pandemic the situation has been exasperated by the lack of real-time testing diagnostics which in turn compromises the safety of vulnerable populations. Further, the ability to identify a signal data signature diagnostic of COVID-19 can have significant benefits for the economic recovery and public health crisis caused by COVID-19.

SUMMARY

This specification describes a signal data signature detection system that includes a machine learning derived strategy for training a compendium of signal data signature classifiers by applying signal data signature classifiers at the natural boundaries within the dataset (e.g., underlying features that lead to class distinctions). The signal data signature detection system components include input data, computer hardware, computer software, and output data that can be viewed by a hardware display media or paper. A hardware display media may include a hardware display screen on a device (computer, tablet, mobile phone), projector, and other types of display media.

Generally, the system performs signal data signature detection on a signal data signature recording using a compendium of signal data signature classifiers that have been trained using a ML-derived blueprint for signal data signature classifiers using paired signal data signature and respiratory condition dataset. The signal data signature detection system receives input paired signal data signature data and a corresponding label that indicates the presence or absence of a medical condition. The signal data signature detection system includes computer hardware that when executed by a processor performs the following steps: 1) splits the paired signal data signature dataset into a training, testing, and validation datasets; 2) defines unique class boundaries for each class within the paired training signal data signature dataset; 3) utilizes the class boundaries within the paired training signal data signature dataset to define a multiple source models where each source model is trained on a separate subset of the paired signal data signature training dataset such that the source modes each produce separate predictions for each input signal data signature; 4) provide each separate prediction from each source model to an oracle model to combine the predictions and produce a final prediction for each input signal data signature; 5) implement signal data signature classifier techniques such as feature extraction, weight-adjustment, and tuning layers to be applied to the source models; 6) train the source models and oracle model based on the labels associated with each input signal data signature of the paired training signal data signature dataset using one or more optimization functions and tuning (e.g., via hyper parameter tuning manually, using heuristics, or by any other suitable means or any combination thereof); 7) implement the combination of the source models and the oracle model as a compendium of signal data signature classifiers for prediction of the unseen paired signal data signature testing dataset, e.g., based on the hyper parameters tuned and training as described above. The signal data signature detection system includes input data paired signal data signature recording data with a label and computer hardware that when executed by a processor returns a compendium of signal data signature classifiers, such that when the signal data signature detection system receives another signal data signature recording without a label the signal data signature detection system will return an output label that can be viewed by a hardware display media or paper.

Advantages of the signal data signature detection system are the following 1) can generate a compendium of signal data signature classifiers from data, 2) can generate a compendium of signal data signature classifiers that can be used to predict a label from an unlabeled signal data signature recording, 3) generates signal data signature classifiers that can be used to classify acute and/or chronic conditions.

The details of one or more embodiments of the subject matter of this specification are set forth in the accompanying drawings and the description below. Other features, aspects, and advantages of the subject matter will become apparent from the description, the drawings, and the claims.

Systems and methods of illustrative embodiments of the present disclosure include at least one hardware device including a processor and a memory unit, where the memory unit is configured to store a computer program or computer programs created by the physical interface on a temporary basis. The computer program, when executed, causes the processor to perform steps to: receive a signal data signature recording from at least one data source; where the memory unit is configured to store the data sources created by the physical interface on a temporary basis; receive a dataset of labeled signal data signature recordings including signal data signature recording labels; where the memory unit is configured to store the signal data signature recording and dataset of labeled signal data signature recordings created by the physical interface on a temporary basis; identify, using at least one machine learning model, boundaries within the dataset of labeled signal data signature recordings; classify the signal data signature recording to produce an output label using a compendium of signal data signature classifiers based on the boundaries within the dataset of labeled signal data signature recordings; determine an output type of the signal data signature recording; and display the output label on a display media.

DETAILED DESCRIPTION

Signal Data Signature Detection System

Figure 1:
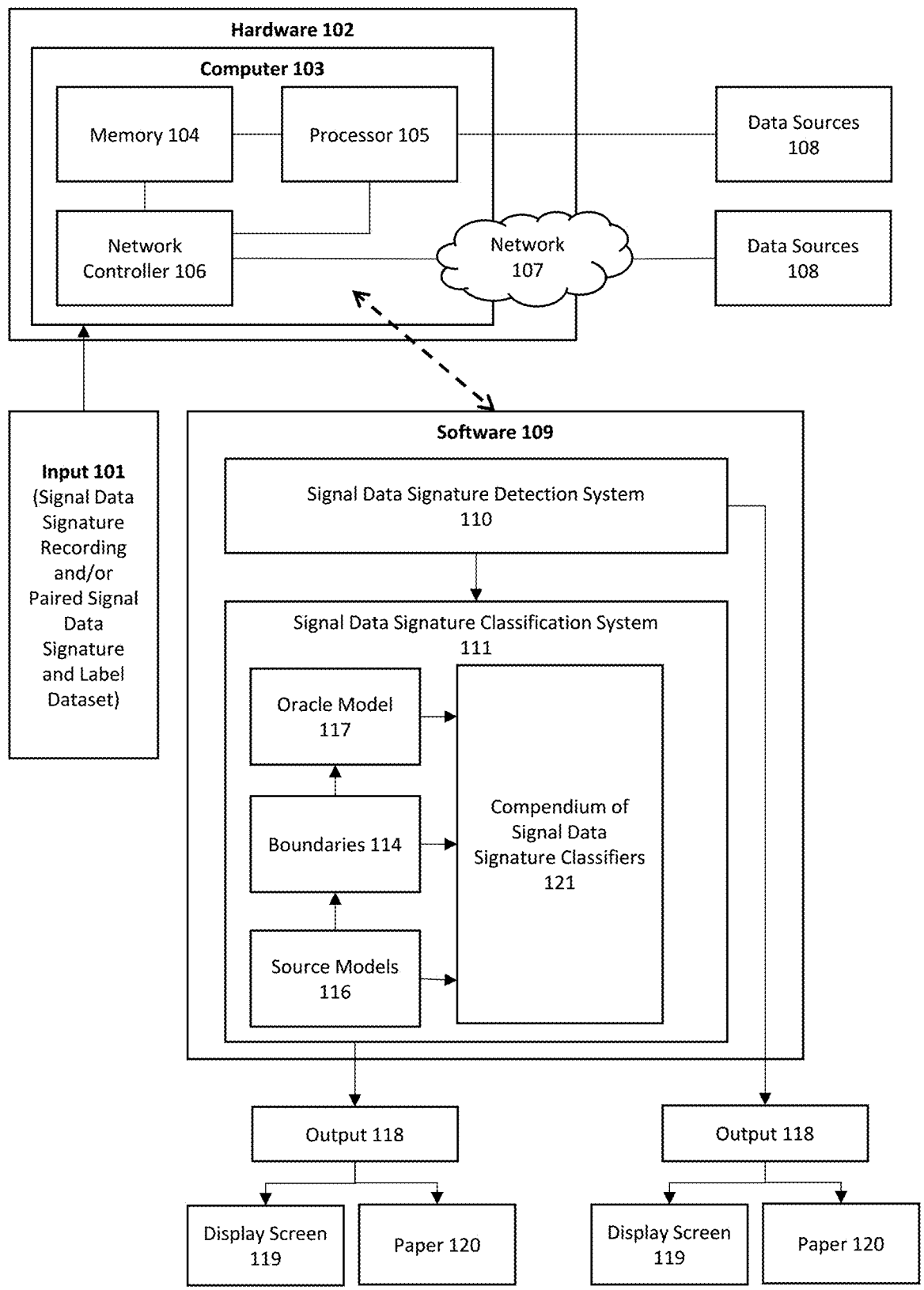
FIG. 1 illustrates a signal data signature detection system in accordance with aspects of embodiments of the present disclosure.

FIGS. 1 through 7 illustrate systems and methods of signal data signature detection using machine learning based techniques. The following embodiments provide technical solutions and/or technical improvements that overcome technical problems, drawbacks and/or deficiencies in the technical fields involving classify and tag signal data signatures from datasets such as for audio recordings. As explained in more detail, below, technical solutions and/or technical improvements herein include aspects of improved signal data signature detection on a signal data signature recording using a compendium of signal data signature classifiers that have been trained using a ML-derived blueprint for signal data signature classifiers using paired signal data signature and respiratory condition dataset. Based on such technical features, further technical benefits become available to users and operators of these systems and methods. Moreover, various practical applications of the disclosed technology are also described, which provide further practical benefits to users and operators that are also new and useful improvements in the art.

Traditional deep learning based approaches may be applied to develop classifiers for a number of respiratory illnesses using cough signal data signature recordings. The challenge with deep learning models that are very specialized to a particular domain or even a specific task is that they are unable to differentiate or further classify negatives. There becomes an uncertainty about whether there is a certain degree of statistical luck as opposed to further discrimination and classification of the negative category. Deep learning models can be trained to classify and predict multiple respiratory illnesses however they are constrained by sample imbalance. In order for a deep neural network to be predictive across multiple respiratory illnesses, the deep neural network must be given a balanced set of labeled signal data.

The unmet need is to classify and tag signal data signatures from datasets. The unmet need may be accomplished with a signal data signature detection system that including hardware devices (e.g., desktop, laptop, servers, tablet, mobile phones, etc.), storage devices (e.g., hard drive disk, floppy disk, compact disk (CD), secure digital card, solid state drive, cloud storage, etc.), delivery devices (paper, electronic display), a computer program or plurality of computer programs, and a processor or plurality of processors. A signal data signature detection system when executed on a processor (e.g., CPU, GPU) would be able to identify a specific signal data signature from other types of signal data signatures and delivered to clinicians and/or end-users through a delivery device (paper, electronic display).

Prior solutions are limited by software programs that require human input and human decision points, algorithms that fail to capture the underlying distribution of signal data signature, algorithms that require balanced datasets, algorithms that are brittle and unable to perform well on datasets that were not present during training.

In some embodiments, a signal data signature detection system may identify a classification label that indicates the presence or absence of a disease when the system is provided with unbalanced paired signal data signature recordings and their corresponding disease labels and another unlabeled signal data signature recording. These embodiments are advantageous for identifying underlying respiratory illnesses and providing in-home, easy to use diagnostics for respiratory conditions.

In some embodiments, in order to achieve a software program that is able, either fully or partially, to detect and diagnose signal data signatures, that program generates a compendium of signal data signature classifiers 121 from a training dataset. Another challenge is that such a program must be able to scale and process large datasets.

Embodiments of the present disclosure are directed to a signal data signature detection system whereby a signal data recording is provided by an individual or individuals(s) or system into a computer hardware whereby labeled data sources and unlabeled data source(s) are stored on a storage medium and then the labeled data sources and unlabeled data source(s) are used as input to a computer program or computer programs which when executed by a processor(s) provides compendium of signal data signature classifiers 121 saved to a hardware device as executable source code such that when executed by a processor(s) with an unlabeled data source(s) generates an output label(s) which is shown on a hardware device such as a display screen or sent to a hardware device such as a printer where it manifests as physical printed paper that indicates the diagnosis of the input signal data recording and signal data signature.

FIG. 1 illustrates a signal data signature detection system 100 with the following components: input 101, hardware 102, software 109, and output 118. The input 101 is a signal data signature recording such as a signal data signature recording captured by a sensor, a signal data signature recording captured on a mobile device, and a signal data signature recording captured on any other device, among others. The input 101 may be provided by an individual, individuals or a system and recorded by a hardware device 102 such as a computer 103 with a memory 104, processor 105 and or network controller 106. A hardware device is able to access data sources 108 via internal storage or through the network controller 106, which connects to a network 107.

In some embodiments, a user may record an input 101 including an audio recording of a vocalization, such as a cough vocalization, including forced and/or unforced cough vocalizations. In some embodiments, the input 101 may be recorded using a recording device. For example, the recording device may include one or more microphones and a software application configured to use the microphones for recording sounds. However, in some embodiments, the recording device may be a peripheral or connected device connected to a user computing device, and the user computing device may include a software application configured to receive or obtain a recording from the recording device.

In some embodiments, the sound signal data signature may include a forced non-speech vocalization, such as, e.g., a cough. A sound signature of a forced non-speech vocalization is unique to each individual. Thus, the user computing device may instruct the user to force a cough vocalization as a way to authenticate a user's identity. The sound signal data signature may also be used to assess changes to the sound signature of the user's sound signal data signature by, e.g., comparing the sound signal data signature to a baseline signature. Thus, the sound signal data signature may be employed to assess any potential changes to the user's sound signal data signature that may indicate a potential respiratory anomaly such as, e.g., any agent, substance, vapor or condition that has an effect on the respiratory system such as, e.g., infections including influence, coronavirus (e.g., the common cold, COVID-19, etc.), pneumonia, bronchitis, or other diseases, conditions such as chronic obstructive pulmonary disease (COPD), asthma, allergies, emphysema, or other conditions, environmental factors such as humidity, air quality and pollution, foreign bodies, foreign substances, etc., or any other respiratory effecting factor or any combination thereof.

In some embodiments, a sound signal data signature analysis system 100 may be in communication with the recording device, e.g., via a network or direct connection. In some embodiments, hardware 102 and/or software 109 of the signal data signature detection system 100 may be configured to receive the input 101 and utilize a signal data signature classifier system 111 in order to identify sound signal data signatures that may represent a condition associated with the input 101.

Accordingly, in some embodiments, the recording device may provide the sound signal data signature to the sound signal data signature detection system 100, e.g., via a sound signal data signature analysis interface. In some embodiments, the sound signal data signature analysis interface may include any suitable interface for data communication over, e.g., a network 107, or via local or direct data communication infrastructure. For example, in some embodiments, the sound signal data signature analysis interface may include wired interfaces such as, e.g., a Universal Serial Bus (USB) interface, peripheral component interconnect express (PCIe), serial AT attachment (SATA), or any other wired interface, or wireless interfaces such as, e.g., Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, or other wireless interface, or any combination of any wired and/or wireless interfaces. In some embodiments, the recording device may communicate the sound signal data signature via the sound signal data signature analysis interface 114 using any suitable data communication protocol, such as, e.g., IPX/SPX, X.25, AX.25, AppleTalk™, TCP/IP (e.g., HTTP), application programming interface (API), messaging protocol or any combination thereof.

In some embodiments, the sound signal data signature analysis interface may include, e.g., an application programming interface. In some embodiments, "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the sound signal data signature detection system 100 may receive the sound signal data signature of the input 101 and analyze the sound signal data signature to determine a sound signal data signature recording of the sound signal data signature isolated from noise and artifacts of in the recorded sound signal data signature, generate a signature for the sound signal data signature recording, and generate a label for the input classifying the sound signal data signature recording, e.g., via a signal data signature classifier system 111. In some embodiments, the sound signal data signature classifier system 111 may include hardware and software components including, e.g., the computer 103 (e.g., including a processor 105, a memory 104, a network controller 106, etc.), e.g., embodied in a user computing device, server, cloud, or a combination thereof.

In some embodiments, the processor 105 may include local or remote processing components. In some embodiments, the processor 105 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 105 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the memory 104 may include any suitable data storage solution, such as local hard-drive, solid-state drive, flash drive, database or other local storage, or remote storage such as a server, mainframe, database or cloud provided storage solution. In some embodiments, the data storage solution may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the signal data signature detection system 100 may implement computer engines, including a signal data signature detection system 110 to determine a sound signal data signature recording of the input 101 isolated from noise and artifacts, a signal data signature classifier system 111 to leverage machine learning models in a transfer learning system 112 to generate one or more labels classifying the input 101 according to trained ML model(s) 113, boundaries 114, a source model 116 and a compendium of signal data signature classifiers 121. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the data sources 108 that are retrieved by the hardware device 102 in one of other possible embodiments includes for example but not limited to: 1) imbalanced paired training dataset of signal data signature recordings and labels and unlabeled signal data signature recording, 2) balanced paired training dataset of signal data signature recordings and labels and unlabeled signal data signature recording, 3) imbalanced paired training dataset of video recordings and labels and unlabeled video recording, 4) imbalanced paired training dataset of video recordings and labels and unlabeled signal data signature recording, 5) paired training dataset of signal data signature recordings and labels and unlabeled video recording. In some embodiments, the term "imbalance" refers to an unequal number of labeled training data compared to labeled training data. Similarity, the term "balance" refers to an equal number of labeled training data compared to labeled training data.

In some embodiments, the data sources 108 and the signal data signature recording input 101 are stored in memory or a memory unit 104 and passed to a software 109 such as computer program or computer programs that executes the instruction set on a processor 105. The software 109 being a computer program executes a signal data signature detector system 110 and a signal data signature classification system 111. The signal data signature classification system 111 executes a signal data signature classifier system 111. The source models 116 define the boundaries 114 and scope to best classify the target. The source models 116 are trained on subsets of the entire training set in order to attempt to deal with data variance among datasets. These source models 116 are also trained using slightly varying model architectures in an attempt to provide a little more understanding of the classification boundaries 114. The oracle model 117 is trained on a new unique dataset that is predicted upon by all the source models 116. The predictions from the source models 116 are used as the oracle model 117 inputs which are then weighted to produce one final result that classifies that outcome of the system. This outcome is a probability (between 0 and 1) that the provided observation belongs to class A which can also be considered as the 1−p probability that it belongs to class B. The system uses the combination of the source models 116 and the final oracle model 117 to produce the predictive value for the user. In some embodiments, the output 118 is a label that indicates the presence or absences of a condition given that an unlabeled signal data signature recording is provided as input 101 to the signal data signature detection system such that the output 118 can be viewed by a reader on a display screen 119 or printed on paper 120.

In some embodiments, a suitable optimization function may be used to train the classifier models, including the source models 116 and the oracle model 117. In some embodiments, each source model 116 and the oracle model 117 may be separately trained using an associated optimization function. For example, each source model 116 may be used to predict a probability value for a training signal data signature and then trained based on error from the associated labeled training data using each associated optimization function. The oracle model 117 may be trained using the predicted probability value from each source model 116 as input to predict a final predicted probability value, and then trained based on the error from the associated labeled training data using the associated optimization function. In some embodiments, the optimization function may employ a loss function, such as, e.g., Hinge Loss, Multi-class SVM Loss, Cross Entropy Loss, Negative Log Likelihood, or other suitable classification loss function to determine the error of the predicted label based on the known output. In some embodiments, the optimization function may include any suitable minimization algorithm for backpropagation such as a gradient method of the loss function with respect to the weights of the classifier machine learning model. Examples of suitable gradient methods include, e.g., stochastic gradient descent, batch gradient descent, mini-batch gradient descent, or other suitable gradient descent technique.

In some embodiments, the signal data signature detection system 100 hardware 102 includes the computer 103 connected to the network 107. The computer 103 is configured with one or more processors 105, a memory or memory unit 104, and one or more network controllers 106. In some embodiments, the components of the computer 103 are configured and connected in such a way as to be operational so that an operating system and application programs may reside in a memory or memory unit 104 and may be executed by the processor or processors 105 and data may be transmitted or received via the network controller 106 according to instructions executed by the processor or processor(s) 105. In some embodiments, a data source 108 may be connected directly to the computer 103 and accessible to the processor 105, for example in the case of a signal data signature sensor, imaging sensor, or the like. In some embodiments, a data source 108 may be executed by the processor or processor(s) 105 and data may be transmitted or received via the network controller 106 according to instructions executed by the processor or processors 105. In one embodiment, a data source 108 may be connected to the signal data signature classifier system 111 remotely via the network 107, for example in the case of media data obtained from the Internet. The configuration of the computer 103 may be that the one or more processors 105, memory 104, or network controllers 106 may physically reside on multiple physical components within the computer 103 or may be integrated into fewer physical components within the computer 103, without departing from the scope of the present disclosure. In one embodiment, a plurality of computers 103 may be configured to execute some or all of the steps listed herein, such that the cumulative steps executed by the plurality of computers are in accordance with the present disclosure.

In some embodiments, a physical interface is provided for embodiments described in this specification and includes computer hardware and display hardware (e.g., the display screen of a mobile device). In some embodiments, the components described herein may include computer hardware and/or executable software which is stored on a computer-readable medium for execution on appropriate computing hardware. The terms "computer-readable medium" or "machine readable medium" should be taken to include a single medium or multiple media that store one or more sets of instructions. The terms "computer-readable medium" or "machine readable medium" shall also be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. In other embodiments, some of these operations might be performed by specific hardware components that contain hardwired logic. Those operations might alternatively be performed by any combination of programmable computer components and fixed hardware circuit components.

In one or more embodiments of the signal data signature classifier system 111 software 109 includes the signal data signature classifier system 111 which will be described in detail in the following section.

In one or more embodiments of the signal data signature detection system 100 the output 118 includes a strongly labeled signal data signature recording and identification of signal data signature type. An example would be signal data signature sample from a patient which would include: 1) a label of the identified signal data signature type, 2) or flag that tells the user that a signal data signature was not detected. The output 118 of signal data signature type or message that a signal data signature was not detected will be delivered to an end user via a display medium such as but not limited to a display screen 119 (e.g., tablet, mobile phone, computer screen) and/or paper 120.

Signal Data Signature Classifier System

Figure 2:
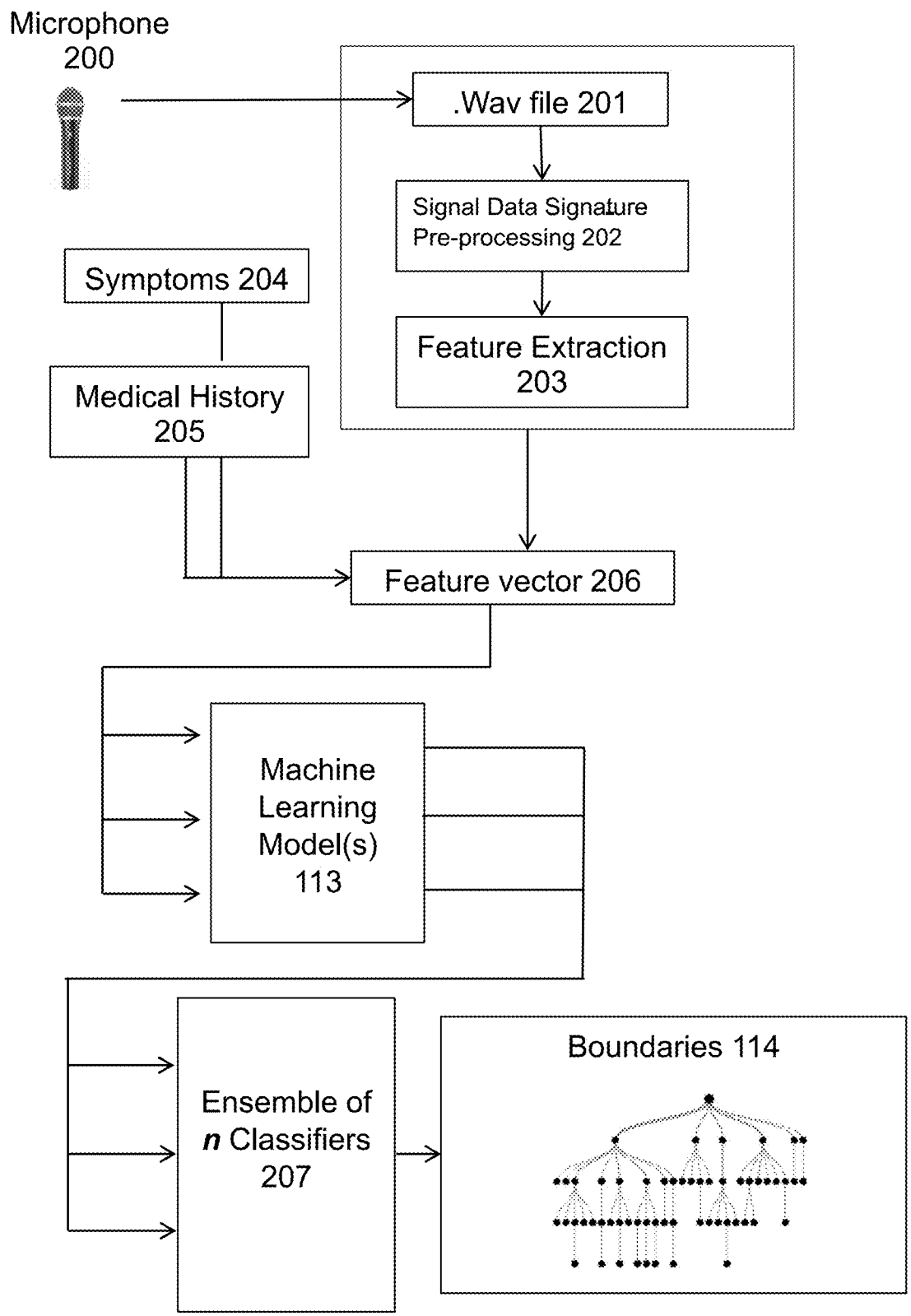
FIG. 2 illustrates a machine learning derived boundaries in accordance with aspects of embodiments of the present disclosure.

In some embodiments, a signal data signature classifier system 111 with real-time training of machine learning models 113 and the real-time training of model(s) 113 and the source model 116, hardware 102, software 109, and output 118. FIG. 2. illustrates an input to the signal data signature classifier system 111 that may include but is not limited to paired training dataset of signal data signature recordings and corresponding signal data signature labels and an unpaired signal data signature recording 101 that is first received and processed as a signal data signature wave by a hardware device such as a microphone 200. In addition, the signal data signature labels may be input into the signal data signature classifier system using a physical hardware device such as a keyboard.

In some embodiments, the signal data signature classifier system 111 uses a hardware 102, which includes a memory or memory unit 104, and processor 105 such that software 109, a computer program or computer programs is executed on a processor 105 and trains in real-time a set of signal data signature classifiers. The output from signal data signature classifier system 111 is a label 118 that matches and diagnosis a signal data signature recording file. A user is able to the signal data signature type output 118 on a display screen 119 or printed paper 120.

In some embodiments, the signal data signature classifiers may be configured to utilize one or more exemplary AI/machine learning techniques for data classification tasks, e.g., such as one or more of the techniques including, but not limited to, decision trees, boosting, support-vector machines, neural networks, nearest neighbor algorithms, Naive Bayes, bagging, random forests, and the like. In some embodiments and, optionally, in combination of any embodiment described above or below, the signal data signature classifiers may include an exemplary neutral network technique such as, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

FIG. 2 depicts a partial view of the signal data signature classifier system 111 with an input signal data signature recording 101 captured using a physical hardware device, microphone 200; such that the signal data signature signal is captured as a .wav file 201, or any other type of computer readable signal data signature signal formatted file, and is then pre-processed 202. Signal Data Signature Pre-Processing 202 imposes a few, basic standards upon the sample via one or more cleansing, filtering and/or normalizing processes. Such cleansing, filtering and/or normalizing ensures high-quality audio files. These filters act to address concerns regarding audio quality for processing, such as, e.g., stereo to mono compatibility, peak input loudness level, and attenuation of unrelated low frequencies or other ancillary noise. Additionally, any other suitable filters may be employed for signal quality optimization, such as one or more filters for, e.g., dynamic range modification (e.g., via dynamic range compression or expansion), optimization of signal to noise ratio, removal, suppression or otherwise mitigation of ancillary noise(s), implementation of bandlimiting to isolate frequency content within a range of interest (e.g., via resampling or the use of equalization filters), among other signal optimizations or any combination thereof. For example, background noise may be filtered from a sample including one or more recordings of a vocalization, and then the vocalization with the recording(s) can be identified, e.g., using a Pretrained Audio Neural Network (PANN) or other detection/recognition tools or any combination thereof. Thus, audio samples that do not contain a vocalization may be prevented from being processed by the system to avoid unnecessary resource utilization.

Figure 4:
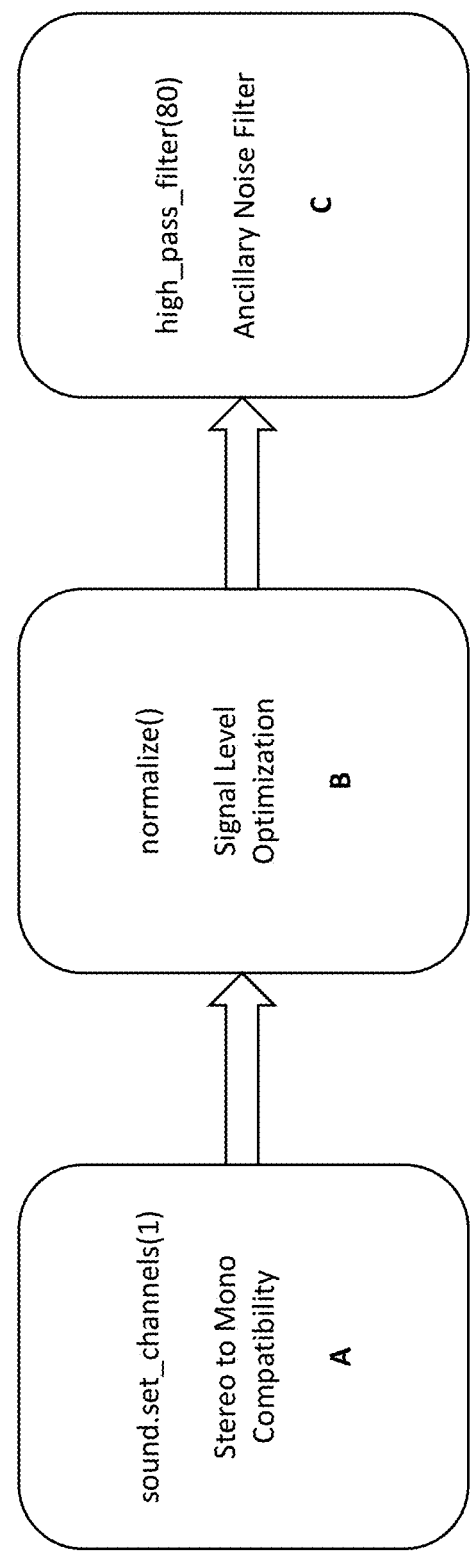
FIG. 4 depicts an example of signal data source pre-processing filters or "Audio Filters" which implement fundamental audio digital signal processing techniques with the purpose of standardizing the overall quality of the signal data source audio signal according to embodiments of the present disclosure.

In some embodiments, as depicted in FIG. 4, the first function of the filter may address Stereo to Mono Compatibility, combines the two channels of stereo information into one single mono representation. This ensures that only a single 'track' or 'channel' of the signal is being considered or analyzed at one time to avoid any potential issues that could arise from mono and stereo cross-compatibility.

In some embodiments, once the signal is summed to mono, it is then normalized, and brought up to its loudest possible peak level while preserving all other spectral characteristics of the source; including frequency content, dynamic range as well as the signal to noise ratio of the sound.

Finally, in some embodiments, the last step is to remove any unwanted low frequency noises that could obscure the analysis of the target sound of the source file. This is achieved by implementing a High Pass Filter. In some embodiments, the High Pass Filter may include a suitable Cutoff to remove low frequency noises not attributable to a user, such as, e.g., a Cutoff of 80 hz at a slope of −36 dB/8 va (Oct), or a Cutoff of a frequency less than or equal to 80 hz, 90 hz, 100 hz, etc. at a slope of between −20 and −55 dB/8 va (Oct), a Frequency Cutoff between 20 hz and 120 hz, at a slope between −48 dB/8 va (octave) and −6 dB/8 va (octave), or any other suitable frequency and slope.

In some embodiments, once signal data signature preprocessing is complete, feature extraction algorithms operate on the pre-processed signal data signature file generating feature extraction 203 which along with or without symptoms 204, medical history 205 are feed into a feature vector 206. The feature vector 206 is used as an input to train machine-learning model(s) 113 which result in an ensemble of n classifiers 207. The ensemble of n classifiers is used to define the natural boundaries 114 in the training dataset.

Figure 5:
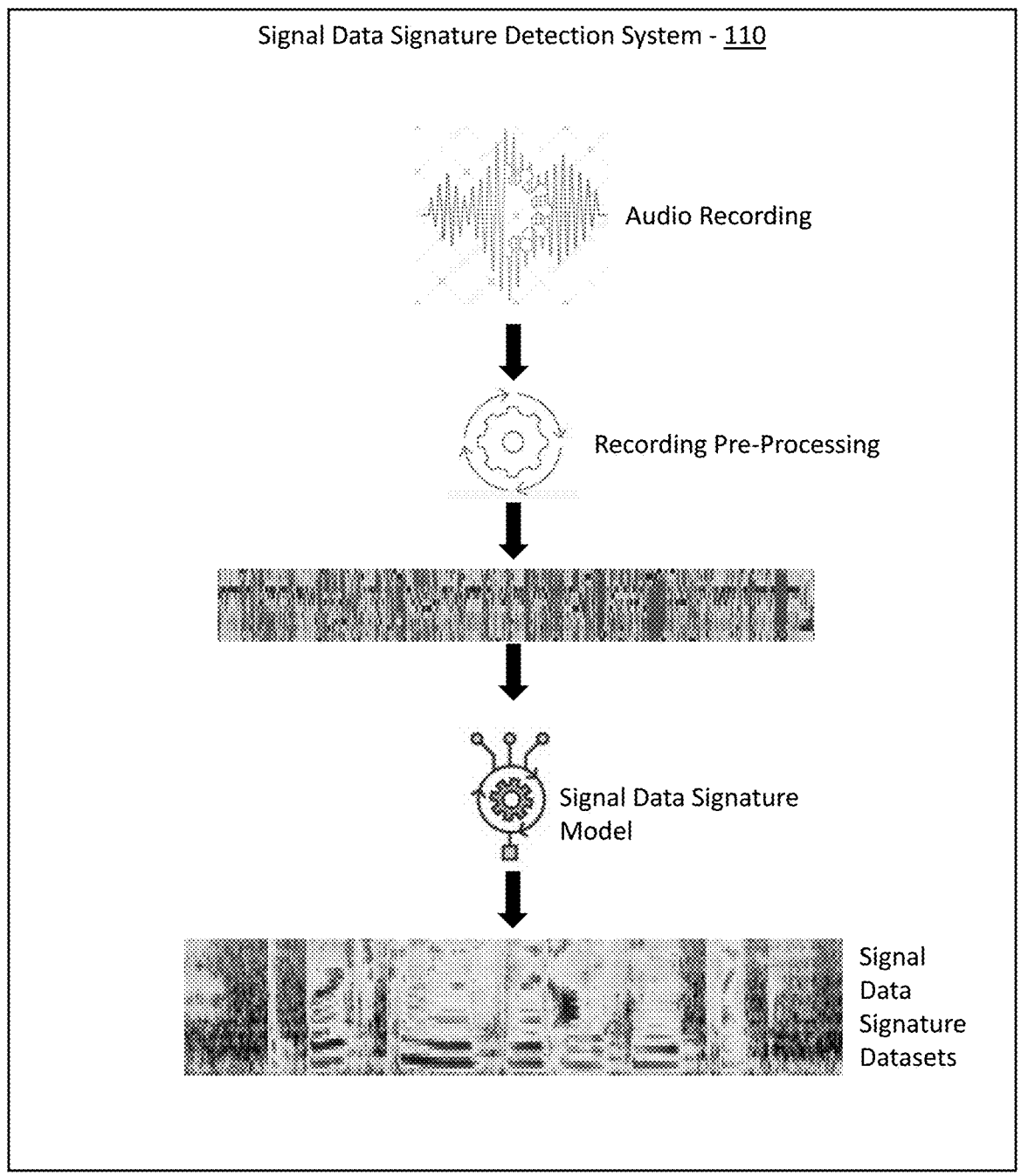
FIG. 5 depicts an example of a signal data signature detection system 110 to produce a signal data signature from an audio recording in accordance with one or more embodiments of the present disclosure.

In some embodiments, an example of the signal data signature detection system 110 is illustrated in FIG. 5. In some embodiments, after filtering the sound signal data signature file is passed to a Hidden Markov Model (HMM) classifier ensemble of the signal data signature detection system 110 to function as an AI sound detector as depicted in FIG. 5. In some embodiments, this sound detector may be trained, utilizing calibration quality professionally audio engineered sound source libraries to differentiate a forced non-speech vocalization from other vocal and non-vocal sounds. The HMM sound detector provides a probability score that the that the incoming sound is a match to the target sound source library and not a match to the not target sound source library.

Figure 6:
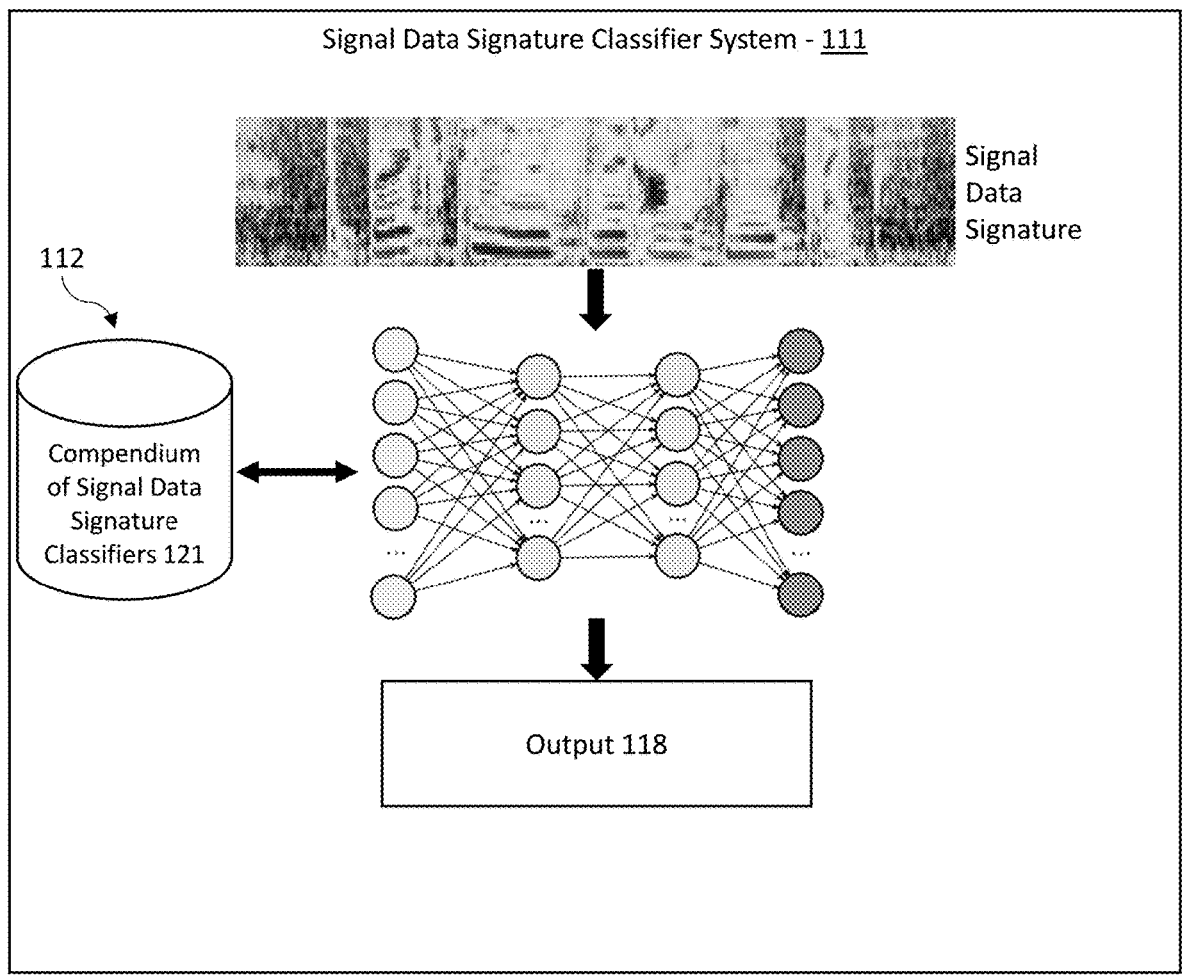
FIG. 6 depicts an example of a signal data signature classifier system 111 for classification of a signal data signature using a compendium of signal data signature classifiers 121 in accordance with one or more embodiments of the present disclosure.

In some embodiments, the sounds above the threshold for match are then passed to a classifier, such as a deep learning or other supervised learning classifier model such as, e.g., a neural network-based classifier (e.g., a convolutional neural network (CNN), recurrent neural network (RNN), or other deep learning neural network (DNN) or any combination thereof), of the signal data signature classifier system 111 as illustrated in FIG. 6. The classifier may include compendium of signal data signature classifiers 121, e.g., stored in the storage 112, for each individual user to determine a label classifying the signal data signature recording. In some embodiments, the label may include a binary label (e.g., "no respiratory anomaly" or "respiratory anomaly", or similar), or a multi-class label such as a label indicating one or more of a set of respiratory conditions or types of conditions, among other labelling schemes.

Figure 3:
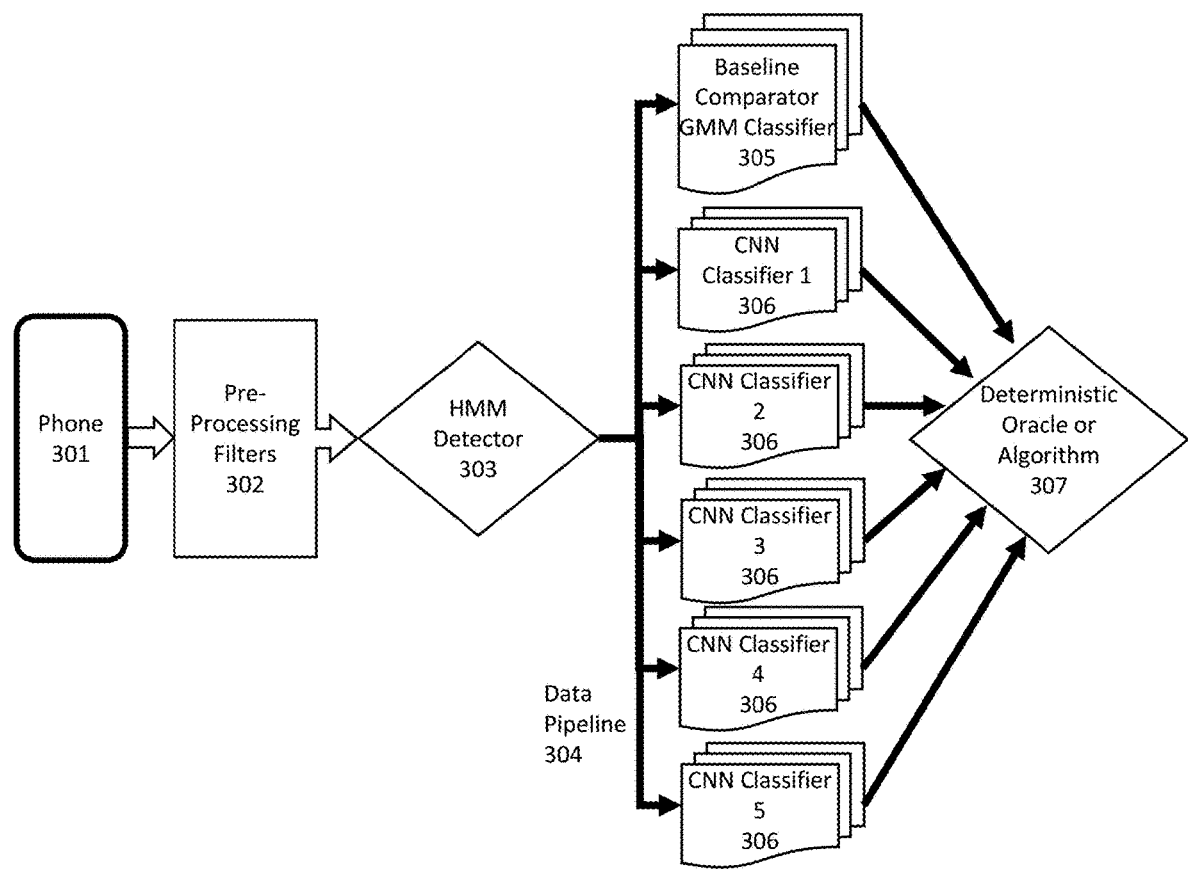
FIG. 3 illustrates a signal data signature classifier system in accordance with aspects of embodiments of the present disclosure.

FIG. 3 depicts an illustrative signal data signature classifier system in accordance with aspects of embodiments of the present disclosure. In some embodiments, referring to FIG. 3, the input signal data signature is captured by a mobile phone or other mobile device using an app or a web client 301. The input signal data signature passes through a pre-processing filter as described for 202 above and for 302 in this figure. The input signal data signature is filtered using a Hidden Markov Model (HMM) detector 303 to help direct signal data signatures 303 to the correct classifiers. A correct classifier is one that accepts the HMM input. Some classifiers do not require the HMM filtering to predict upon the SDS while others do require it as a preprocessing step. This is determined by model type and what data the model was trained upon. If a source model was trained on HMM filtered data then it will require the HMM filtered data to make a prediction whereas some models that are not trained on HMM filtered data will not use HMM filtered data when making predictions and are not the correct classifiers in this case.

The data then flows through a parallel data pipeline 304. Concurrently, the data is passed to multiple convolutional neural network classifiers (CNN) 306 existing as instances in identical environments trained with randomly selected signal data signatures from a large pool of calibration quality signal data signatures classify the input signal data signature. In some embodiments, each CNN classifier 306 may be trained using separate subsets of a signal data signature library or signal data signature training dataset. Thus, each CNN classifier 306 may have a same or different architecture as each other CNN classifier 306, but is trained on a different set of data. Thus, each CNN classifier 306 may output a probability value indicative of a probability of the input signal data signature being within one or more classes of signal data signatures (e.g., vocal quality, respiratory condition/disease, respiratory condition/disease type, respiratory anomaly, vocal anomaly, sound source, sound type, or other suitable audio-based classification framework or any suitable combination thereof). In some embodiments, the probability value may be indicative of a probability that the input signal data signature matches one or more particular signal data signatures in the signal data signature library. Each signal data signature in the signal data signature library may pertain to a particular class, and thus the probability of a match may indicate the probability of the input signal data signature being a member of the associated class. Each CNN classifier 306 may output a probability value that is particular to the respective training of each respective CNN classifier 306 according to each respective subset of the signal data signature library.

The relative probability of the input signal data signature matching a signal data signature library in each classifier is passed to a deterministic oracle/algorithm 307. In some embodiments, the deterministic oracle/algorithm 307 may combine the probability value of each source model, for example a CNN source in 306, to generate a final deterministic probability value and associated output label 118. In some embodiments, the final deterministic probability value may include a suitable statistical aggregation technique, such as, e.g., an average, a weighted average, a sum, a weight sum, a median, a boosting, a weighted median, or any other suitable aggregation technique or any combination thereof. In some embodiments, the deterministic oracle/algorithm 307 may include, e.g., a machine learning model trained to aggregate the probability values of each CNN source model 306 to produce the final probability value. For example, the deterministic oracle/algorithm 307 may include, e.g., random forest, a CNN, an RNN, a support vector machine, or other suitable machine learning model or any combination thereof. As a result, the oracle 307 may determine a final prediction and label to produce the output label 118 for the input signal data signature.

Figure 7:
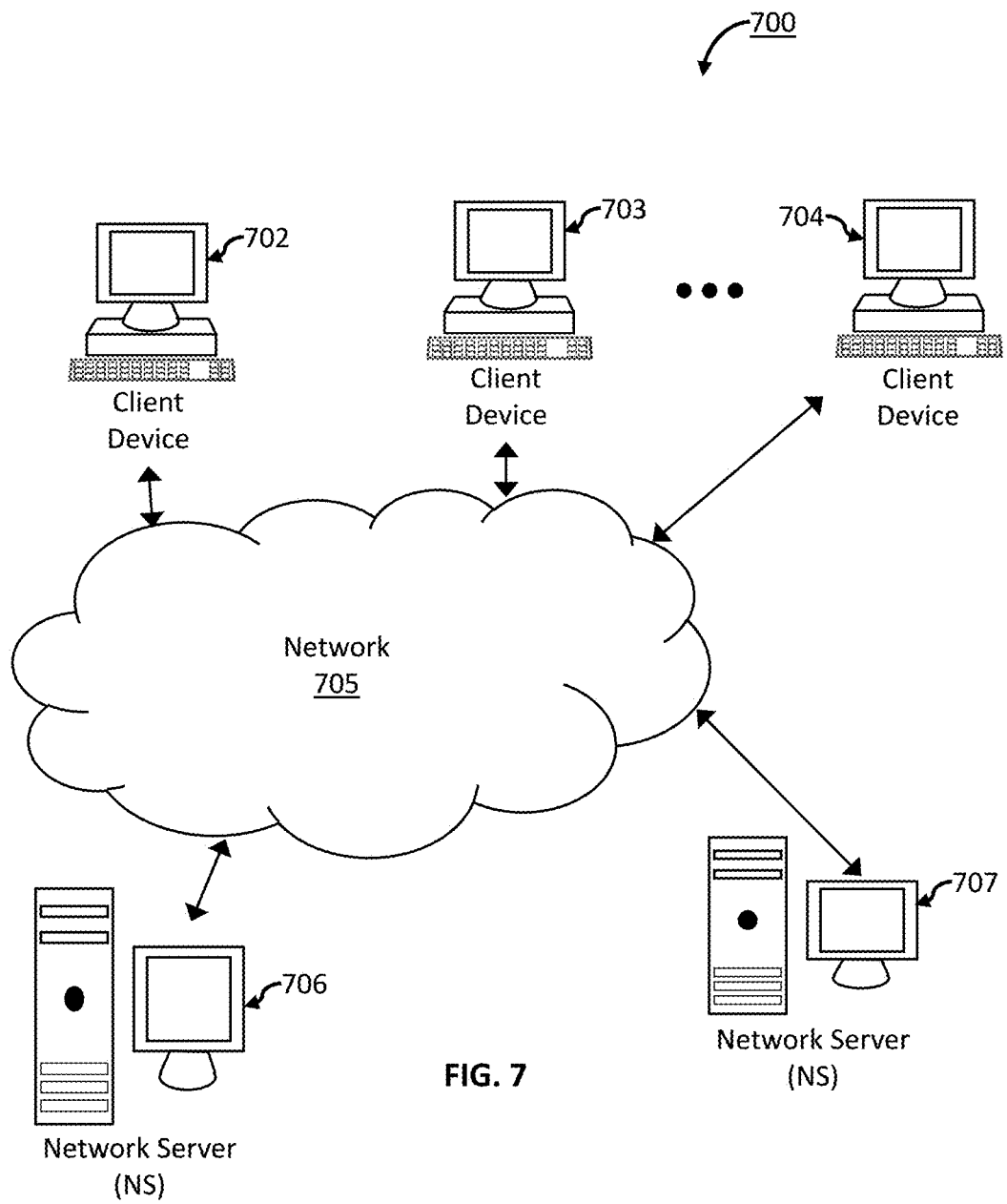
FIG. 7 depicts a block diagram of an exemplary computer-based system and platform 700 in accordance with one or more embodiments of the present disclosure.

FIG. 7 depicts a block diagram of an exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 700 may be configured to manage a large number of members and concurrent transactions, as detailed herein. In some embodiments, the exemplary computer-based system and platform 700 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 7, members 702-704 (e.g., clients) of the exemplary computer-based system and platform 700 may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer or machine readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
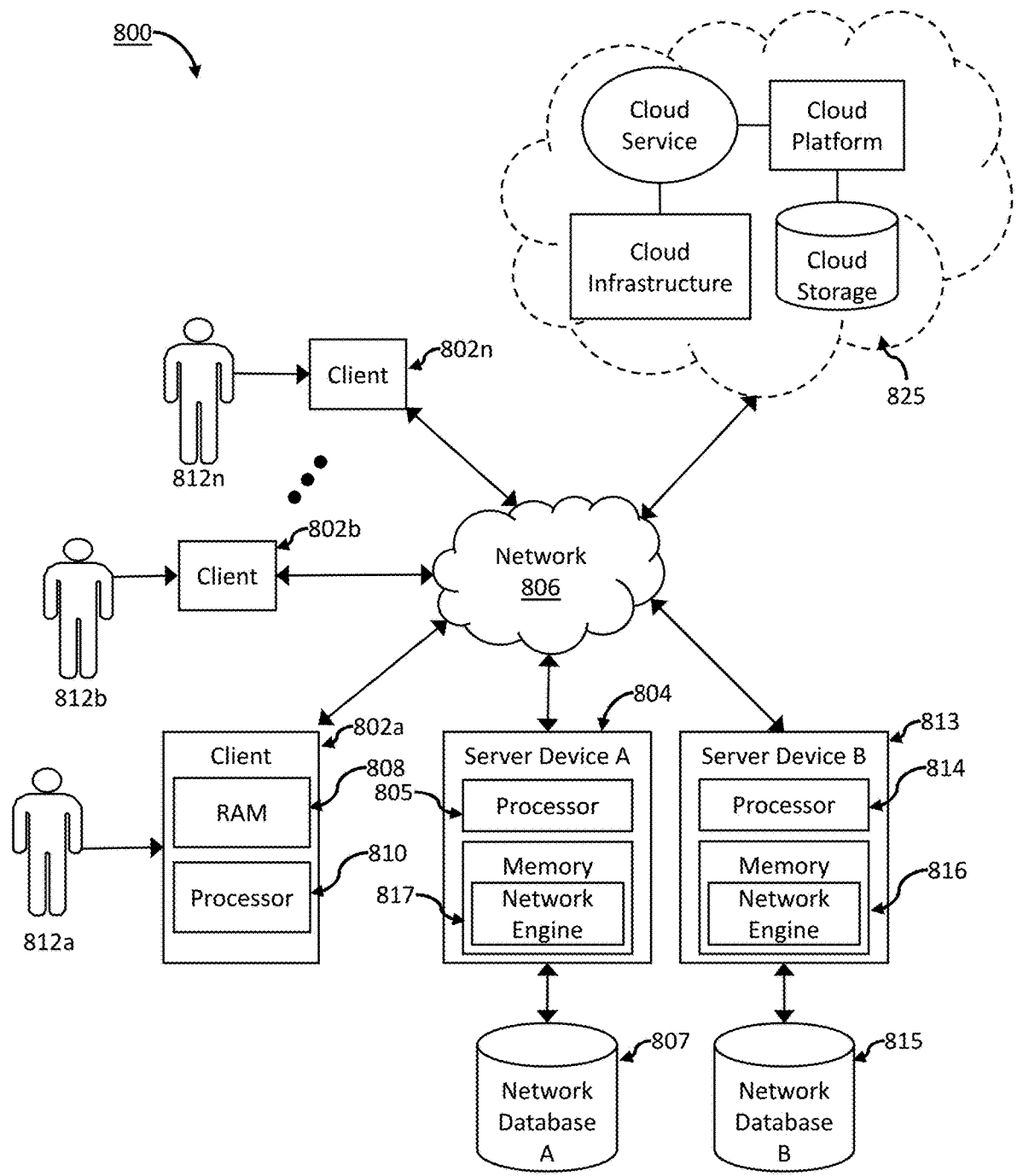
FIG. 8 depicts a block diagram of another exemplary computer-based system and platform 800 in accordance with one or more embodiments of the present disclosure.

FIG. 8 depicts a block diagram of another exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 802n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
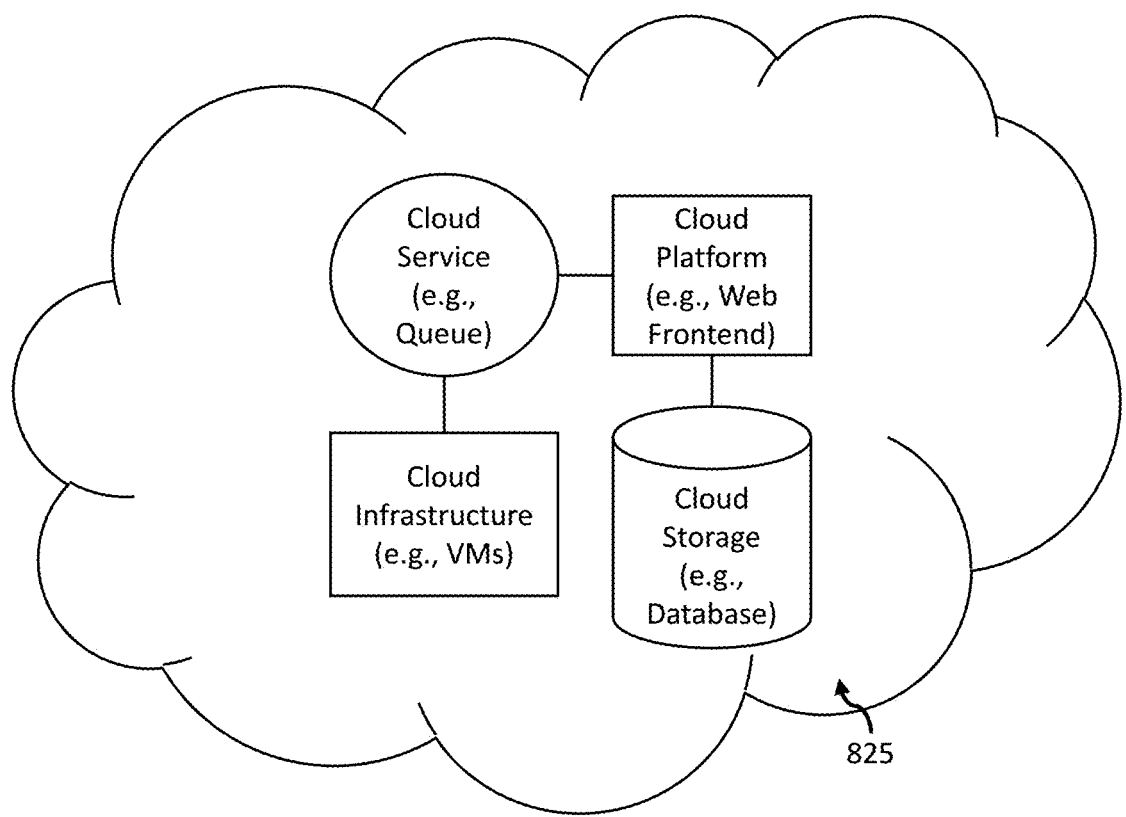
FIG. 9 illustrates schematics of an exemplary implementation of the cloud computing/architecture(s) in which the exemplary inventive computer-based systems/platforms, the exemplary inventive computer-based devices, and/or the exemplary inventive computer-based components of the present disclosure may be specifically configured to operate.
Figure 10:
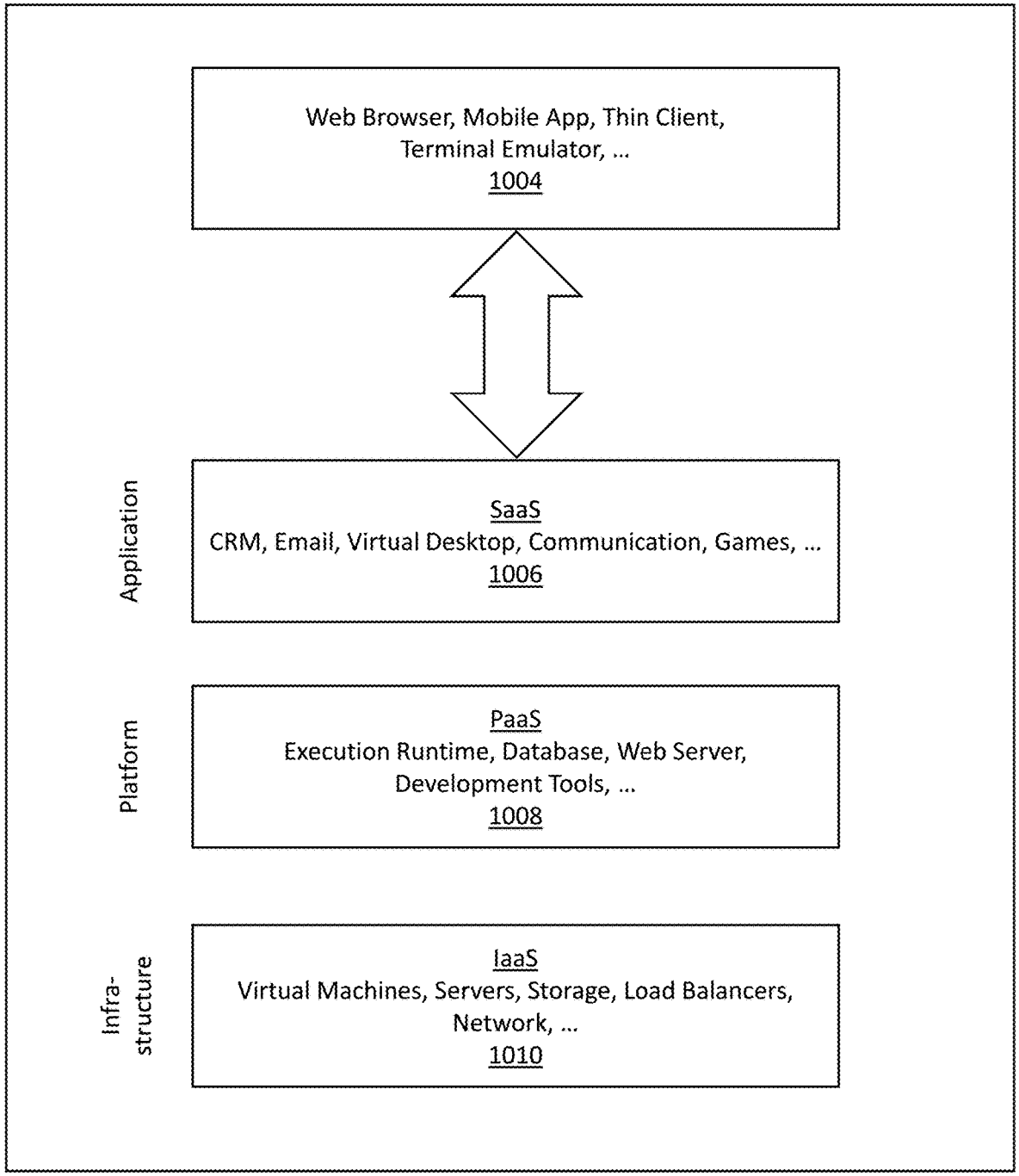
FIG. 10 illustrates schematics of another exemplary implementation of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be specifically configured to operate in a cloud computing/architecture 825 such as, but not limiting to: infrastructure a service (IaaS) 1010, platform as a service (PaaS) 1008, and/or software as a service (SaaS) 1006 using a web browser, mobile app, thin client, terminal emulator or other endpoint 1004. FIG. 9 and FIG. 10 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

The aforementioned examples are, of course, illustrative and not restrictive.

At least some aspects of the present disclosure will now be described with reference to the following numbered clauses.

1. A signal data signature detection system, comprising:
    a physical hardware device comprising of a memory unit and processor;
        wherein the memory unit is configured to store a computer program or computer programs created by the physical interface on a temporary basis;
        wherein the computer program, when executed, causes the processor to perform steps to:
            receive a signal data signature recording from at least one data source;
                wherein the memory unit is configured to store the data sources created by the physical interface on a temporary basis;
            receive a dataset of labeled signal data signature recordings including signal data signature recording labels;
                wherein the memory unit is configured to store the signal data signature recording and dataset of labeled signal data signature recordings created by the physical interface on a temporary basis;
            identify, using at least one machine learning model, boundaries within the dataset of labeled signal data signature recordings;
            classify the signal data signature recording to produce an output label using a compendium of signal data signature classifiers based on the boundaries within the dataset of labeled signal data signature recordings;
            determine an output type of the signal data signature recording; and
            display the output label on a display media.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A signal data signature detection system, comprising:
    a physical hardware device comprising of a memory unit and processor;
    wherein the memory unit is configured to store a computer program or computer programs;
    wherein the computer program, when executed, causes the processor to perform steps to:
        receive a signal data signature recording from at least one data source wherein the signal data signature recording is representative of at least one forced cough vocalization of a person;
        wherein the memory unit is configured to store the data sources;
        receive a dataset of labeled signal data signature recordings including signal data signature recording labels;
        wherein the labeled signature data signature records comprise a plurality of historical signal data signature records paired with a plurality of known cough diagnosis labels representative of a diagnosis of at least one respiratory condition;

identify, using at least one machine learning model, boundaries within the dataset of labeled signal data signature recordings;

partition, based on the boundaries, the dataset of labeled signal data signature recordings into a plurality of subsets, wherein the partitioning mitigates class imbalance among different signal data signature recording labels;

train, for each subset, a corresponding source model of a plurality of source models using the labeled signal data signature recordings of the respective subset to generate a compendium of signal data signature classifiers:

generate, for the signal data signature recording, at least one classification probability from each source model;

aggregate the at least one classification probability from each source model using an oracle model trained to combine outputs of the plurality of source models to produce a final probability value;

classify the signal data signature recording to produce an output label based at least in part on the final probability value;

wherein the output label comprises a most probable cough diagnosis of the at least one forced cough vocalization of the person;

determine an output type of the signal data signature recording based on the output label; and display the output label on a display media.

2. The signal data signature detection system of claim 1, wherein each signal data signature classifier of the compendium of signal data signature classifiers comprises a deep neural network.

3. The signal data signature detection system of claim 1, wherein the computer program, when executed, further causes the processor to perform steps to utilize at least one hidden Markov model (HMM) to filter the signal data signature recording to produce a filtered signal data signature recording.

4. The signal data signature detection system of claim 3, wherein the computer program, when executed, further causes the processor to perform steps to:

identify at least one signal data signature classifier in the compendium of signal data signature classifiers for classifying the signal data signature recording based at least in part on the signal data signature recording; and utilize the at least one signal data signature classifier to generate the output label based at least in part on the filtered signal data signature recording.

5. The signal data signature detection system of claim 1, wherein the computer program, when executed, further causes the processor to perform steps to:

train, with at least one subset of the dataset of labeled signal data signature recordings, each source model of a plurality of source models to produce at least one training classification probability for each labeled signal data signature recording of the subset of the dataset of labeled signal data signature recordings based on the signal data signature recording labels;

train, with the dataset of labeled signal data signature recordings, an oracle model to classify the at least one training classification probability of each source model for each labeled signal data signature recording of the dataset of labeled signal data signature recordings based on the signal data signature recording labels; and generate the compendium of signal data signature classifiers from the plurality of source models and the oracle model.

6. The signal data signature detection system of claim 5, wherein the computer program, when executed, further causes the processor to perform steps to:

utilize the plurality of source models to produce at least one classification probability for the signal data signature recording, wherein the at least one classification probability comprises at least one source probability value indicative a probability of at least one source label; and utilize the oracle model to produce a final probability value for the signal data signature recording based at least in part on the at least one classification probability of each source model of the plurality of source models; and generate the output label based at least in part on the final probability value.

7. The signal data signature detection system of claim 1, wherein the source data signature recording comprises an audio recording of the at least one forced cough vocalization associated with a user.

8. A method, comprising:

receiving, by at least one processor, a signal data signature recording from at least one data source, wherein the signal data signature recording is representative of at least one forced cough vocalization of a person;

receiving, by the at least one processor, a dataset of labeled signal data signature recordings including signal data signature recording labels;

wherein the labeled signature data signature records comprise a plurality of historical signal data signature records paired with a plurality of known cough diagnosis labels representative of a diagnosis of at least one respiratory condition;

identifying, by the at least one processor using at least one machine learning model boundaries within the dataset of labeled signal data signature recordings;

partitioning, by the at least one processor, the dataset of labeled signal data signature recordings into a plurality of subsets based on the boundaries, wherein the partitioning mitigates class imbalance among different signal data signature recording labels;

training, by the at least one processor, for each subset, a corresponding source model of a plurality of source models using the labeled signal data signature recordings of the respective subset to generate a compendium of signal data signature classifiers;

generating, by the at least one processor, for the signal data signature recording, at least one classification probability from each source model;

aggregating, by the at least one processor, the at least one classification probability from each source model using an oracle model trained to combine outputs of the plurality of source models to produce a final probability value;

classifying, by the at least one processor, the signal data signature recording to produce an output label based at least in part on the final probability value, wherein the output label comprises a most probable cough diagnosis of the at least one forced cough vocalization of the person;

determining, by the at least one processor, an output type of the signal data signature recording based on the output label; and displaying, by the at least one processor, the output label on a display media.

9. The method of claim 8, wherein each signal data signature classifier of the compendium of signal data signature classifiers comprises a deep neural network.

10. The method of claim 8, further comprising utilizing, by the at least one processor, at least one hidden Markov model (HMM) to filter the signal data signature recording to produce a filtered signal data signature recording.

11. The method of claim 10, further comprising:
identifying, by the at least one processor, at least one signal data signature classifier in the compendium of signal data signature classifiers for classifying the signal data signature recording based at least in part on the signal data signature recording; and
utilizing, by the at least one processor, the at least one signal data signature classifier to generate the output label based at least in part on the filtered signal data signature recording.

12. The method of claim 8, further comprising:
training, by the at least one processor with at least one subset of the dataset of labeled signal data signature recordings, each source model of a plurality of source models to produce at least one training classification probability for each labeled signal data signature recording of the subset of the dataset of labeled signal data signature recordings based on the signal data signature recording labels;
training, by the at least one processor with the dataset of labeled signal data signature recordings, an oracle model to classify the at least one training classification probability of each source model for each labeled signal data signature recording of the dataset of labeled signal data signature recordings based on the signal data signature recording labels; and
generating, by the at least one processor, the compendium of signal data signature classifiers from the plurality of source models and the oracle model.

13. The method of claim 12, further comprising:
utilizing, by the at least one processor, the plurality of source models to produce at least one classification probability for the signal data signature recording, wherein the at least one classification probability comprises at least one source probability value indicative a probability of at least one source label; and
utilizing, by the at least one processor, the oracle model to produce a final probability value for the signal data signature recording based at least in part on the at least one classification probability of each source model of the plurality of source models; and
generating, by the at least one processor, the output label based at least in part on the final probability value.

14. The method of claim 8, wherein the source data signature recording comprises an audio recording of a cough vocalization associated with a user.

15. A non-transitory computer readable medium, comprising computer programming instructions, wherein the computer programming instructions are configured to cause at least one processor to perform steps comprising:
receiving a signal data signature recording from at least one data source, wherein the signal data signature recording is representative of at least one forced cough vocalization of a person;
receiving a dataset of labeled signal data signature recordings including signal data signature recording labels; wherein the labeled signature data signature records comprise a plurality of historical signal data signature records paired with a plurality of known cough diagnosis labels representative of a diagnosis of at least one respiratory condition;
identifying, using at least one machine learning model, boundaries within the dataset of labeled signal data signature recordings;
partitioning, by the at least one processor, the dataset of labeled signal data signature recordings into a plurality of subsets based on the boundaries, wherein the partitioning mitigates class imbalance among different signal data signature recording labels;
training, by the at least one processor, for each subset, a corresponding source model of a plurality of source models using the labeled signal data signature recordings of the respective subset to generate a compendium of signal data signature classifiers;
generating, by the at least one processor, for the signal data signature recording, at least one classification probability from each source model;
aggregating, by the at least one processor, the at least one classification probability from each source model using an oracle model trained to combine outputs of the plurality of source models to produce a final probability value;
classifying the signal data signature recording to produce an output label based at least in part on the final probability value;
wherein the output label comprises a most probable cause diagnosis of the at least one forced cough vocalization of the person;
determining an output type of the signal data signature recording based on the output label; and
displaying the output label on a display media.

16. The non-transitory computer readable medium of claim 15, wherein each signal data signature classifier of the compendium of signal data signature classifiers comprises a deep neural network.

17. The non-transitory computer readable medium of claim 15, wherein the steps further comprise utilizing at least one hidden Markov model (HMM) to filter the signal data signature recording to produce a filtered signal data signature recording.

18. The non-transitory computer readable medium of claim 17, wherein the steps further comprise:
identifying at least one signal data signature classifier in the compendium of signal data signature classifiers for classifying the signal data signature recording based at least in part on the signal data signature recording; and
utilizing the at least one signal data signature classifier to generate the output label based at least in part on the filtered signal data signature recording.

19. The non-transitory computer readable medium of claim 15, wherein the steps further comprise:
training, with at least one subset of the dataset of labeled signal data signature recordings, each source model of a plurality of source models to produce at least one training classification probability for each labeled signal data signature recording of the subset of the dataset of labeled signal data signature recordings based on the signal data signature recording labels;
training, with the dataset of labeled signal data signature recordings, an oracle model to classify the at least one training classification probability of each source model for each labeled signal data signature recording of the dataset of labeled signal data signature recordings based on the signal data signature recording labels; and generating the compendium of signal data signature classifiers from the plurality of source models and the oracle model.

20. The non-transitory computer readable medium of claim 15, wherein the steps further comprise:
utilizing the plurality of source models to produce at least one classification probability for the signal data signature recording, wherein the at least one classification probability comprises at least one source probability value indicative a probability of at least one source label; and
utilizing the oracle model to produce a final probability value for the signal data signature recording based at least in part on the at least one classification probability of each source model of the plurality of source models; and
generating the output label based at least in part on the final probability value.

* * * * *